Nov. 13, 1951  R. SCHWAYDER  2,575,028

ROTATION REGULATING DEVICE

Filed Jan. 29, 1947

INVENTOR
ROBERT SCHWAYDER
BY: John H Graham
ATTORNEY.

Patented Nov. 13, 1951

2,575,028

UNITED STATES PATENT OFFICE 2,575,028

ROTATION REGULATING DEVICE

Robert Schwayder, Paris, France, assignor to Societe Anonyme dite: Etablissements Edgar Brandt, Paris, France Application January 29, 1947, Serial No. 725,138
In France January 30, 1946

4 Claims. (Cl. 74—574)

The present invention concerns a regulating device designed to stabilize and uniformize the rotation of shafts driven by means of repeated impulses whose frequency and (or) intensity may vary in time with more or less abrupt irregularities.

It is more particularly concerned with a rotation regulating device for a shaft driven by repeated impulses transmitted thereto through the medium of a belt which receives such impulses before it becomes engaged with the shaft or with a drum carried by the same. For instance, such a drive is that of a sound-reading drum in certain moving picture flashing apparatus.

According to certain characteristics of the invention the regulating device comprises a flywheel rigidly connected with a shaft on which the member driven into rotation is mounted through the medium of a rolling friction coupling, e. g. a ball friction coupling, the said shaft being mounted in its bearings through the medium of very low friction connections such as cone-and-ball connections.

Figure 1:
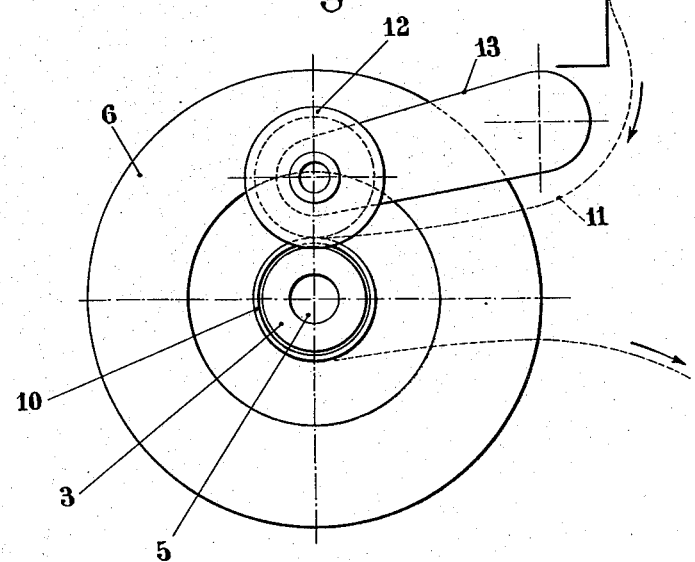
Figure 2:
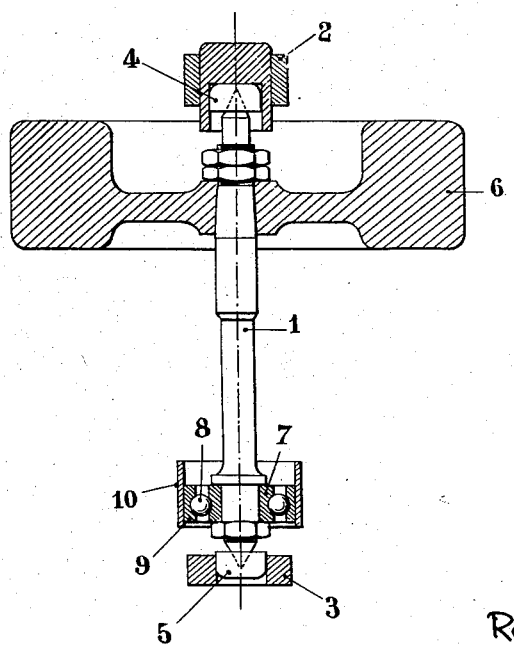

Figures 1 and 2 of the appended drawings diagrammatically represent an example of a regulating device according to the present invention in side view and in plan and partly sectional view respectively.

In this embodiment a shaft 1 is mounted in supports 2 and 3 through the medium of cone-and-ball bearings 4 and 5 or any other very low friction bearing type.

Secured on shaft 1 are on one hand a flywheel 6 and on the other hand the inner race 7 of a ball bearing 8. The outer race of said ball bearing is rigidly connected with the sound-reading drum 10 which is capable of driving the shaft 1 through the medium of said bearing while leaving the shaft 1 and the flywheel 6 carried thereby substantially free to rotate if the drum 10 should happen to be decelerated abruptly.

The drum 10 is driven by the film 11 to which, before it engages the drum, repeated push impulses are imparted in the direction shown by the arrow by any suitable means (not shown, e. g. a claw feed mechanism).

The film passes as indicated around the drum 10 on which it is pressed by a roll 12 urged by any suitable resilient means diagrammatically shown at 13.

When the film 11, set in position with the loop shown, begins to move as a result of the driving impulses it will drive the sound-reading drum 10. After a very short time the drum will drive the shaft 1 and consequently the flywheel 6 by the action of the ball bearing. Generally, the normal lubrication of the race is sufficient to make this coupling effective after a suitably short time; if not, the addition of a small amount of lubricant in the race will enable to adjust this starting time to the desired value.

As soon as the flywheel 6 is driven it acts as an impulse integrator, and any lack of uniformity in the driving impulses, for instance in the intensity of some of them, will be offset automatically by the reaction upon the reading drum of the momentum thus stored. Should the drum happen to be stopped unexpectedly, the shaft 1 and the flywheel would very rapidly become disconnected from the drum, such disconnection being taken care of by the ball bearing, and no action is exerted upon the shaft. Conversely, as soon as the drum is released, connection is restored within a short period of time and the flywheel will immediately come again into play as a rotation regulating member provided it has not lost its momentum altogether.

Obviously, numerous modifications may be contemplated without departing from the scope of the invention; for instance, in some applications, the ball bearings may be replaced by roller or needle bearings or other roller friction devices, the cone-and-ball bearings by other types of frictionless bearings, etc.

What I claim as my invention and desire to secure by Letters Patent is:

1. A regulating device comprising a rotatable shaft, a fly wheel carried by said shaft for rotation therewith, bearing means carried by said shaft, a rotary member rotatably carried by said bearing means, and means to impart drag to said bearing means.

2. A regulating device comprising a rotatable shaft, a fly wheel carried by said shaft for rotation therewith, a ball bearing means carried by said shaft, a drum rotatably carried by said ball bearing means, and fluid means in said ball bearing to impart drag thereto.

3. A regulating device comprising a rotatable shaft, a fly wheel carried by said shaft for rotation therewith, a ball bearing means carried by said shaft, a drum rotatably carried by said ball bearing means and lubricant in said ball bearing means for imparting drag to said bearing.

4. A regulating device for sound film drums comprising a rotatable shaft, bearing means on said shaft, a rotatable sound drum carried by said bearing means, means to impart drag to said bearing means, and a fly wheel carried by said shaft remote from said drum for rotation with said shaft.

ROBERT SCHWAYDER.

REFERENCES CITED

The following references are of record in the file of this patent:

UNITED STATES PATENTS

| Number | Name | Date |
|---|---|---|
| 2,013,109 | Reynolds | Sept. 3, 1935 |
| 2,019,147 | Loomis et al. | Oct. 29, 1935 |
| 2,100,751 | Runge | Nov. 30, 1937 |
| 2,102,895 | Hasbroreck | Dec. 21, 1937 |
| 2,113,256 | Jeanne | Apr. 5, 1938 |
| 2,196,064 | Erban | Apr. 2, 1940 |
| 2,261,410 | Perez | Nov. 4, 1941 |

FOREIGN PATENTS

| Number | Country | Date |
|---|---|---|
| 303,640 | Italy | Dec. 12, 1932 |